(12) United States Patent
Geelen et al.

(10) Patent No.: US 8,352,180 B2
(45) Date of Patent: Jan. 8, 2013

(54) DEVICE WITH CAMERA-INFO

(75) Inventors: Pieter Geelen, Amsterdam (NL); Marc Mattu, Amsterdam (NL)

(73) Assignee: Tomtom International B.V., Amsterdam (NL)

( * ) Notice: Subject to any disclaimer, the term of this patent is extended or adjusted under 35 U.S.C. 154(b) by 0 days.

(21) Appl. No.: 13/432,183

(22) Filed: Mar. 28, 2012

(65) Prior Publication Data

US 2012/0191346 A1 Jul. 26, 2012

Related U.S. Application Data

(63) Continuation of application No. 11/920,730, filed on Aug. 19, 2008.

(51) Int. Cl.
*G01C 21/26* (2006.01)
*G01C 21/28* (2006.01)

(52) U.S. Cl. .... 701/431; 701/454; 701/541; 340/995.24

(58) Field of Classification Search .................. None
See application file for complete search history.

(56) References Cited

U.S. PATENT DOCUMENTS

| | | | |
|---|---|---|---|
| 5,115,398 A | 5/1992 | De Jong | |
| 5,161,886 A | 11/1992 | De Jong et al. | |
| 5,815,411 A * | 9/1998 | Ellenby et al. ............... | 702/150 |
| 6,735,517 B2 | 5/2004 | Engelsberg et al. | |
| 7,039,521 B2 | 5/2006 | Hortner et al. | |
| 7,088,389 B2 * | 8/2006 | Shibasaki et al. ............ | 348/239 |
| 7,366,595 B1 | 4/2008 | Shimizu et al. | |
| 7,456,847 B2 * | 11/2008 | Krajec ........................... | 345/629 |
| 7,460,953 B2 | 12/2008 | Herbst et al. | |
| 7,490,294 B2 | 2/2009 | Okada | |
| 2003/0160153 A1 | 8/2003 | Hara et al. | |
| 2004/0056963 A1 | 3/2004 | Ishikawa | |
| 2004/0179104 A1 | 9/2004 | Benton | |
| 2004/0201706 A1 | 10/2004 | Shimizu et al. | |
| 2004/0212686 A1 | 10/2004 | Usami | |
| 2004/0236506 A1 | 11/2004 | Kolb et al. | |
| 2005/0179801 A1 * | 8/2005 | Miwa et al. .................... | 348/335 |
| 2006/0004512 A1 | 1/2006 | Herbst et al. | |
| 2006/0074549 A1 | 4/2006 | Takahashi et al. | |
| 2006/0155466 A1 | 7/2006 | Kanda et al. | |
| 2006/0271284 A1 | 11/2006 | Watanabe et al. | |
| 2007/0088497 A1 * | 4/2007 | Jung ............................... | 701/207 |
| 2008/0195315 A1 | 8/2008 | Hu et al. | |
| 2010/0029293 A1 | 2/2010 | Bergh et al. | |

FOREIGN PATENT DOCUMENTS

| | | |
|---|---|---|
| DE | 10236221 C1 | 11/2003 |
| EP | 0899542 A1 | 3/1999 |
| GB | 2414799 A | 12/2005 |
| JP | 63-088403 A | 4/1988 |
| JP | 9304101 A | 11/1997 |

(Continued)

OTHER PUBLICATIONS

International Search Report issued Apr. 27, 2006 for International Application No. PCT/NL2005/000405.

(Continued)

*Primary Examiner* — Michael J. Zanelli

(57) ABSTRACT

The present application relates to a device, such as a navigation device, for vehicular and non-vehicular use, e.g. by pedestrians. The device is arranged to receive a feed from a camera. The navigation device is further arranged to display a combination of a camera image from the feed from the camera and virtual signage on the display. The virtual signage relating to roads, buildings, points of interest and the like.

10 Claims, 8 Drawing Sheets

FOREIGN PATENT DOCUMENTS

Figure 1:
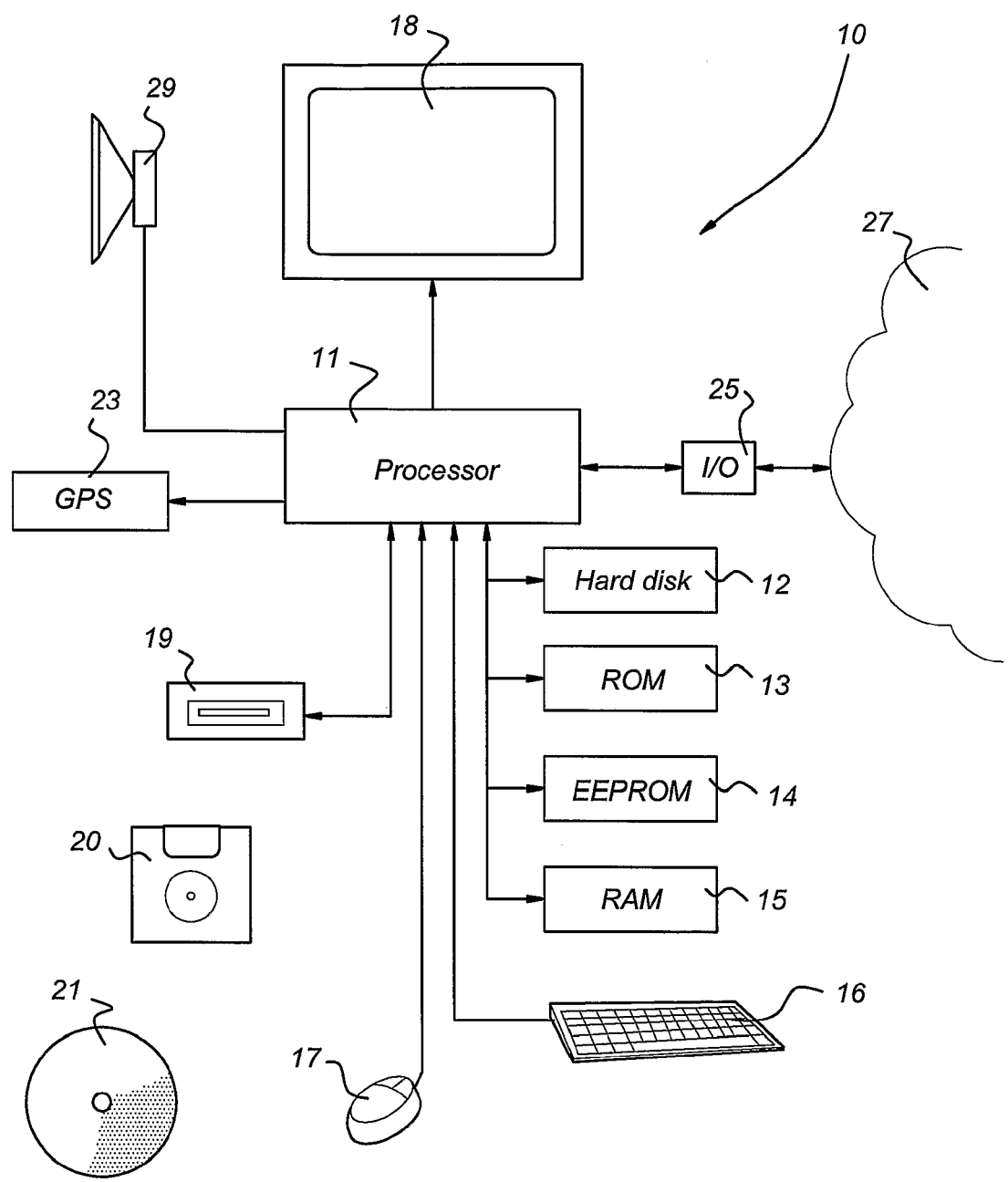

| | | | |
|---|---|---|---|
| JP | 10-047978 A | | 2/1998 |
| JP | 10-132598 A | | 5/1998 |
| JP | 10132598 A | | 5/1998 |
| JP | 11-86034 | * | 3/1999 |
| JP | 11-108684 A | | 4/1999 |
| JP | 11257992 A | | 9/1999 |
| JP | 11-304499 A | | 11/1999 |
| JP | 11338339 A | | 12/1999 |
| JP | 2000251193 A | | 9/2000 |
| JP | 2001272242 A | | 10/2001 |
| JP | 2002213973 A | | 7/2002 |
| JP | 2002228466 A | | 8/2002 |
| JP | 2003111128 A | | 4/2003 |
| JP | 2003214889 A | | 7/2003 |
| JP | 2003216982 A | | 7/2003 |
| JP | 2004077189 A | | 3/2004 |
| JP | 2004257979 A | | 9/2004 |
| JP | 2005-214857 | * | 8/2005 |
| JP | 2008096268 A | | 4/2008 |
| JP | 11-023305 | | 2/2011 |
| WO | 03/017226 A2 | | 2/2003 |
| WO | 2004048895 A1 | | 6/2004 |
| WO | 2004076979 A1 | | 9/2004 |
| WO | 2007119472 A1 | | 10/2007 |

* cited by examiner

DEVICE WITH CAMERA-INFO

CROSS REFERENCE TO RELATED APPLICATIONS

This application is a continuation of U.S. patent application Ser. No. 11/920,730 filed Aug. 19, 2008; the entire contents of which is incorporated herein by reference.

FIELD OF THE INVENTION

The present invention relates to a navigation device, the navigation device being arranged to display navigation directions on a display.

Also, the present invention relates to a vehicle comprising such a navigation device, and a method for providing navigation directions. Moreover, the present invention relates to a computer program and a data carrier.

STATE OF THE ART

Prior art navigation devices based on GPS (Global Positioning System) are well known and are widely employed as in-car navigation systems. Such a GPS based navigation device relates to a computing device which in a functional connection to an external (or internal) GPS receiver is capable of determining its global position. Moreover, the computing device is capable of determining a route between start and destination addresses, which can be input by a user of the computing device. Typically, the computing device is enabled by software for computing a "best" or "optimum" route between the start and destination address locations from a map database. A "best" or "optimum" route is determined on the basis of predetermined criteria and need not necessarily be the fastest or shortest route.

The navigation device may typically be mounted on the dashboard of a vehicle, but may also be formed as part of an on-board computer of the vehicle or car radio. The navigation device may also be (part of) a hand-held system, such as a PDA.

By using positional information derived from the GPS receiver, the computing device can determine at regular intervals its position and can display the current position of the vehicle to the user. The navigation device may also comprise memory devices for storing map data and a display for displaying a selected portion of the map data.

Also, it can provide instructions how to navigate the determined route by appropriate navigation directions displayed on the display and/or generated as audible signals from a speaker (e.g. 'turn left in 100 m'). Graphics depicting the actions to be accomplished (e.g. a left arrow indicating a left turn ahead) can be displayed in a status bar and also be superimposed upon the applicable junctions/turnings etc. in the map itself.

It is known to enable in-car navigation systems to allow the driver, whilst driving in a car along a route calculated by the navigation system, to initiate a route re-calculation. This is useful where the vehicle is faced with construction work or heavy congestion.

It is also known to enable a user to choose the kind of route calculation algorithm deployed by the navigation device, selecting for example from a 'Normal' mode and a 'Fast' mode (which calculates the route in the shortest time, but does not explore as many alternative routes as the Normal mode).

It is also known to allow a route to be calculated with user defined criteria; for example, the user may prefer a scenic route to be calculated by the device. The device software would then calculate various routes and weigh more favourably those that include along their route the highest number of points of interest (known as POIs) tagged as being for example of scenic beauty.

In the prior art, navigation devices display maps that are, like most maps, a highly stylised or schematic representation of the real world. Many people find it difficult to translate this quite abstract version of the real world into something that can readily be recognised and understood. Navigation devices are known that display a (semi) three dimensional projection of the map, as would be seen from above and/or behind the vehicle. This is done to make it easier for the user to interpret the displayed map data, as it corresponds to the user's visual perception of the world. However, such a (semi) perspective view is a stylised or schematic representation that still is relatively difficult to be interpreted by users.

Yet the need to enable people to easily and rapidly follow directions that are shown on the display is especially acute in a personal navigation system, such as may be used as an in-car navigation system. It will be understood that a driver of a vehicle should spend as little time as possible watching and interpreting the displayed map data, as his/her main attention should be focussed on the road and the traffic.

SHORT DESCRIPTION OF THE INVENTION

Therefore, it is an object of the invention to provide a navigation device that overcomes at least one of the problems mentioned above and displays instructions for the user that allow easy interpretation.

In order to obtain this object, the invention provides a navigation device according to the preamble, characterised in that, the navigation device is further arranged to receive a feed from a camera, and the navigation device being arranged to display a combination of a camera image from the feed from the camera and the navigation directions on the display.

By superimposing or combining navigation directions over a camera image, a user-friendly view is presented to the driver that allows easy and rapid interpretation. There is no need for the user to translate an abstract representation of the real-world, because the camera image is a one-to-one representation of the real-life view as seen by the user. The combination of the feed from the camera and the navigation directions could be all kinds of combinations, such as superimposing one over the other, showing simultaneously on different parts of the display. The combination may however also be a combination in time, i.e. alternately showing the camera feed and the navigation directions. This may change after a predetermined time interval (e.g. 5 seconds) or may change as a result of an input by the user.

According to a further embodiment, the invention relates to a navigation device, wherein the camera is formed integrally with the navigation device. Such a navigation device doesn't require an external camera feed. The navigation device can for instance simply be mounted on a dashboard of a vehicle, in such a way that the camera provides an image through the front screen.

According to a further embodiment, the invention relates to a navigation device wherein the navigation directions are one or more of position arrow, route, arrow, points of interest, roads, buildings, map data such as vector data, stored in at least a memory unit, such as a hard disk, a Read Only Memory, Electrically Erasable Programmable Read Only Memory and a Random Access Memory. All kind of navigation directions can be displayed. It is noted that these navigations directions may also provide information that is not per se needed for navigation (finding a route), but may also provide the user with additional information.

According to a further embodiment, the invention relates to a navigation device further being arranged to superimpose the navigation directions over the camera image such that the position of the navigation directions are in a predefined spatial relationship with respect to corresponding parts of the camera image. This provides the user with an image that can very easy be interpreted, as all the navigation directions may be displayed such that they match with the actual position of the corresponding item in the camera image. For instance, an arrow indicating a right turn may be superimposed over the camera image such that it matches with the turn as visible in the camera image.

According to a further embodiment, the invention relates to a navigation device, wherein the navigation device comprises a processing unit, a positioning device and orientation sensors, the positioning device and the orientation sensors being arranged to communicate with the processing unit, the processing unit being arranged to use readings from the positioning device and the orientation sensors to compute a position and an orientation of the camera and/or the navigation device, based on which the position of the navigation directions on the display are computed by the processing unit. Knowing the exact position and orientation of the camera and/or the navigation device allows more exact superimposing of the navigation directions over the camera feed.

According to a further embodiment, the invention relates to a navigation device, wherein the positioning device determines a geographical location, using positioning sensing technology, such as GPS, European Galileo system or any other global navigation satellite system, or positioning sensing technology based on ground-based beacons.

According to a further embodiment, the invention relates to a navigation device, wherein the processing unit computes the orientation of the camera with respect to a first rotational axis that in use is substantially vertical, by comparing the positions of the camera and/or the navigation device determined by the positioning device at subsequent points in time. By comparing the positions of the camera and/or navigation device at subsequent points in time, the direction of travel of the camera and/or navigation device can be computed. From this, the orientation and the change of orientation of the camera can be computed.

According to a further embodiment, the invention relates to a navigation device, wherein the navigation device comprises a compass providing compass readings to the processing unit, the processing unit being arranged to compute the orientation of the camera with respect to a first rotational axis that in use is substantially vertical, based on the compass readings. A compass provides an easy an advantageous way of determining the orientation of the camera.

According to a further embodiment, the invention relates to a navigation device, wherein the orientation sensors comprise tilt sensors to determine the orientation of the camera with respect to second and third rotational axes, the second and third rotational axes in use being substantially horizontal. In order to combine or superimpose the navigation directions in a more accurate way with respect to the camera image, the rotational orientation of the camera is measured with respect to a second and/or third direction.

According to a further embodiment, the invention relates to a navigation device, wherein the processing unit uses pattern recognition techniques to superimpose the navigation directions over the camera image such that the position of the navigation directions are in a predefined spatial relationship with respect to corresponding parts of the camera image. By using pattern recognition techniques, the navigation directions can be combined and/or superimposed over the camera feed without knowing the exact orientation of the camera. Determining the position of the navigation directions over the displayed camera image may be done by solely using pattern recognition techniques, but the pattern recognition techniques may also be used in combination with a determined orientation of the camera, to further increase the accuracy.

According to a further embodiment, the invention relates to a navigation device, wherein the navigation device uses map data as input for the pattern recognition techniques. Using map data may simplify the pattern recognition techniques, as it is easier to recognise for instance a road, when it is approximately known from the map data where the road is. This makes the pattern recognition more accurate and/or may save computation time.

According to a further embodiment, the invention relates to a navigation device, wherein the navigation device is arranged to receive calibration corrections, to store these calibration corrections, and to apply the calibration corrections when combining the navigation directions and the camera image. This is in particular advantageous when the navigation directions are combined in such a way, that the navigation directions are superimposed over the camera image to have a predefined spatial relationship with respect to the camera image. The calibrations corrections may be used to cancel offset errors.

According to a further embodiment, the invention relates to a navigation device, wherein the navigation device is arranged to receive or read in camera settings and use the camera settings to compute the position of the navigation directions on the display. Different camera settings may result in different camera feeds. Providing the navigation device with these camera settings further increases the accuracy of the combination of the navigation directions with the camera image.

According to a further embodiment, the invention relates to a navigation device, wherein the navigation device is further arranged to receive feeds from more than one camera, and the navigation device being arranged to select one of the feeds to be displayed on the display. The more than one camera feeds, providing different perspectives, may for instance be used by pattern recognition techniques to increase the quality of pattern recognition using mathematics. The more than one camera may also be used to provide the user with the option of choosing between different camera angles.

According to a further embodiment, the invention relates to a navigation device, wherein the camera is sensitive to electromagnetic radiation outside the range of the electromagnetic spectrum that is visible by the human eye.

According to a further embodiment, the invention relates to a navigation device, wherein the camera is an infrared camera. Such a camera enables use of the navigation device at night.

According to a further embodiment, the invention relates to a navigation device, wherein the camera is arranged to zoom in and/or to zoom out. This allows the user to adjust the camera view according to his or her preferences.

According to a further embodiment, the invention relates to a navigation device, wherein the camera is arranged to zoom in or out depending on, for instance, the speed of the navigation device/vehicle. This provides a camera feed that is automatically adjusted to the speed of the navigation device. So, in case the speed of the navigation device is relatively high, the camera may zoom in to give the user a better view further ahead.

According to a further aspect, the invention relates to a dashboard, comprising a navigation device according to the above.

According to a further aspect, the invention relates to a vehicle, comprising a navigation device according to the above.

According to a further embodiment, the invention relates to a vehicle, wherein the vehicle comprises a vehicle tilt sensor to determine the tilt of the vehicle, providing vehicle tilt readings to the navigation device. This is an advantageous way of measuring the tilt of the vehicle.

According to a further aspect, the invention relates to a method for providing navigation directions, the method comprising:
 displaying navigation directions on a display, characterised in that, the method further comprises:
 receiving a feed from a camera, and
 displaying a combination of a camera image from the feed from the camera and the navigation directions over the camera image on the display.

According to a further aspect, the invention relates to a computer program, when loaded on a computer arrangement, arranged to perform the above method.

According to a further aspect, the invention relates to a data carrier, comprising a computer program as described above.

SHORT DESCRIPTION OF THE DRAWINGS

Figure 2:
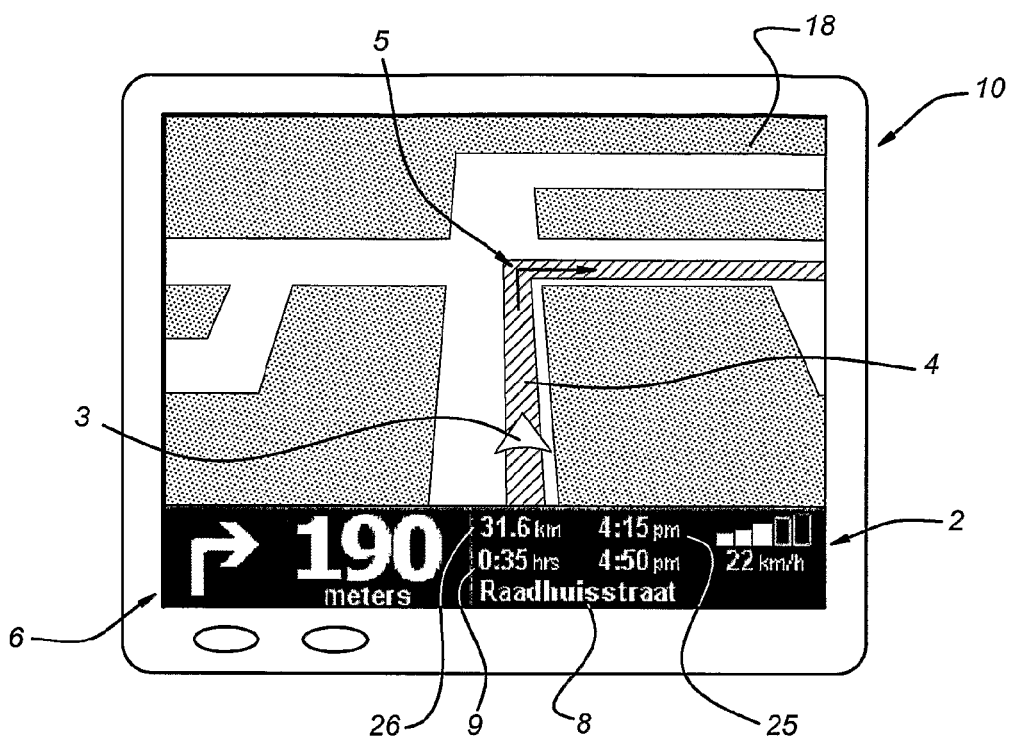
Figure 4:
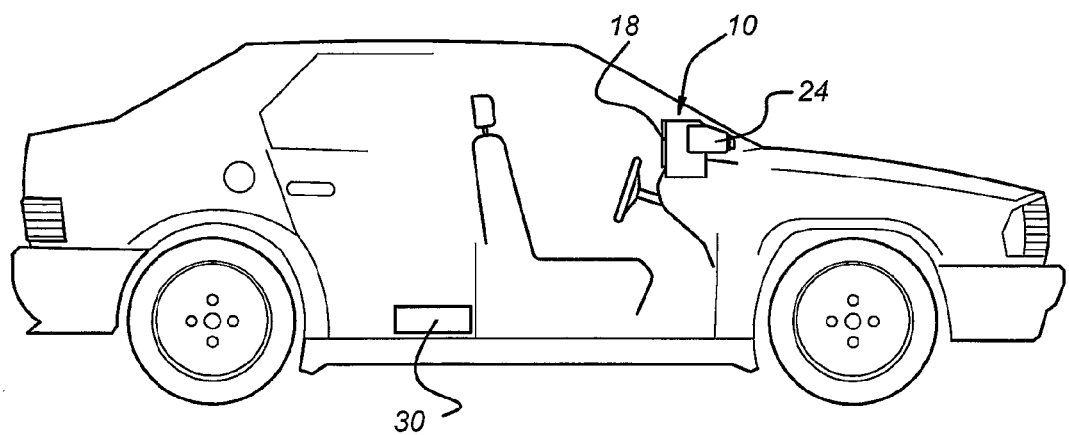
Figure 3:
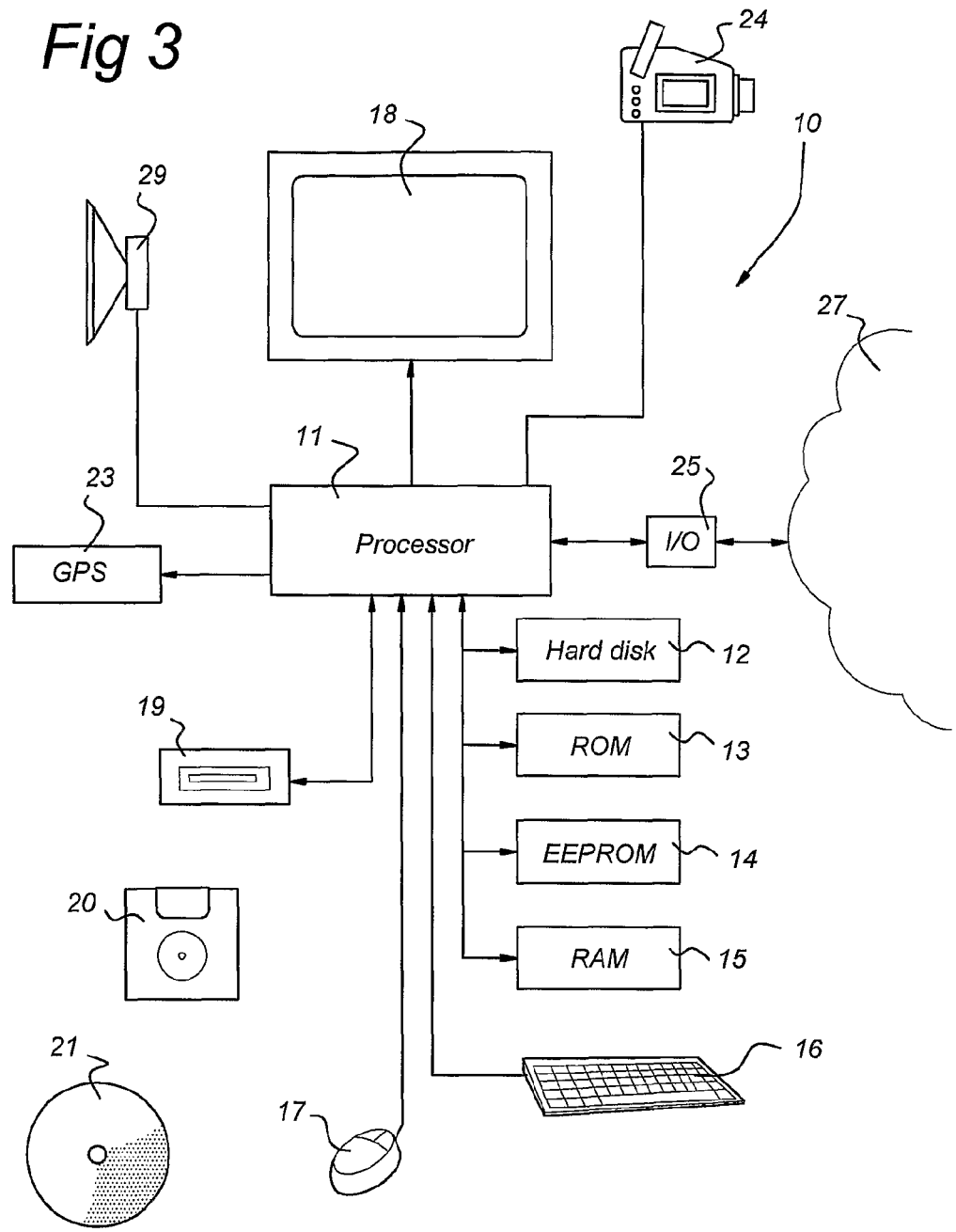
Figure 5:
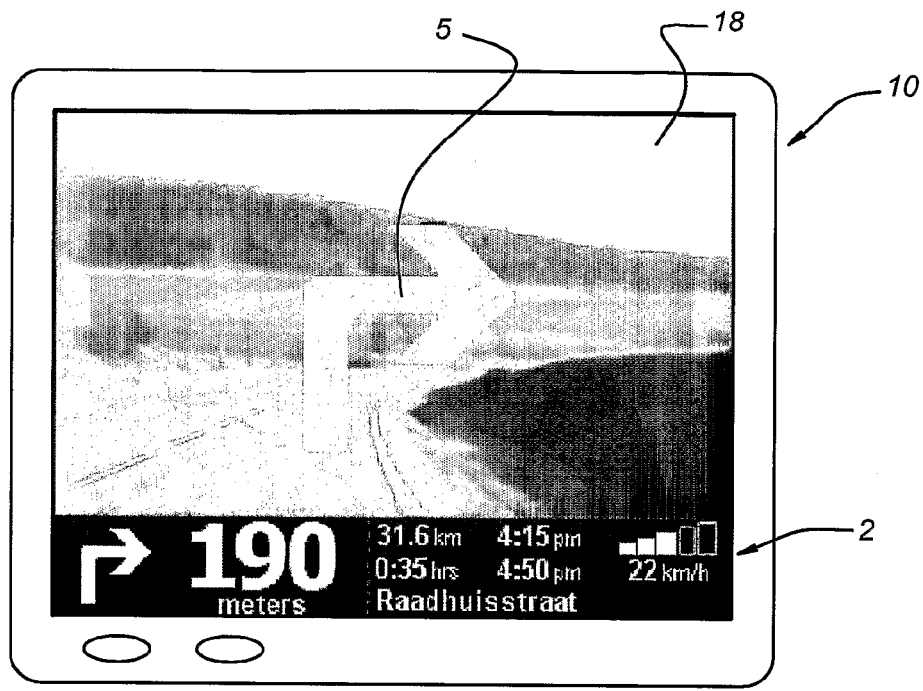
Figure 6:
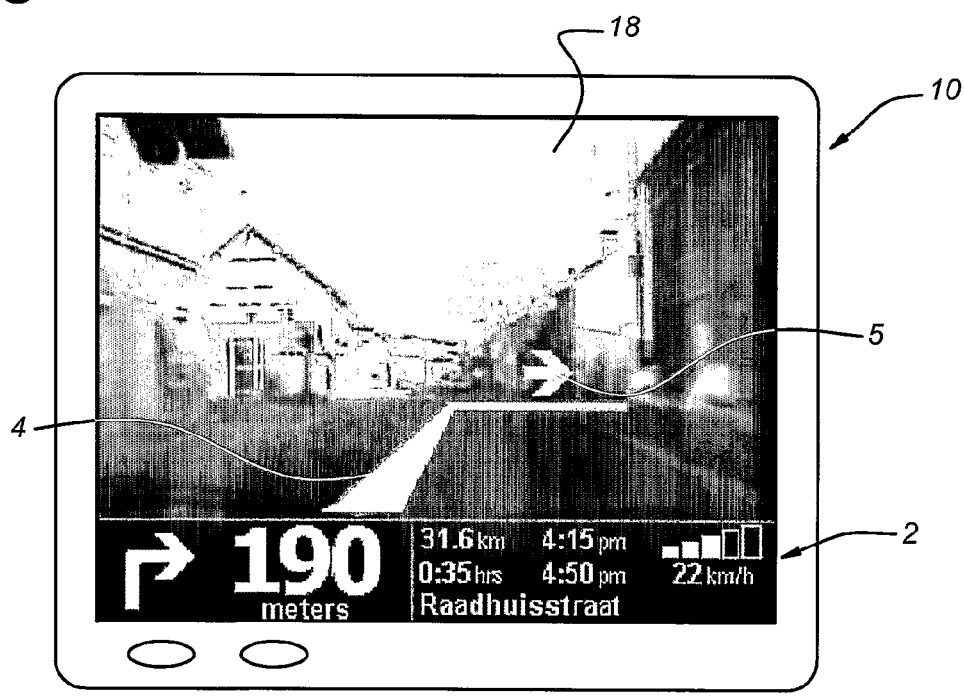
Figure 7:
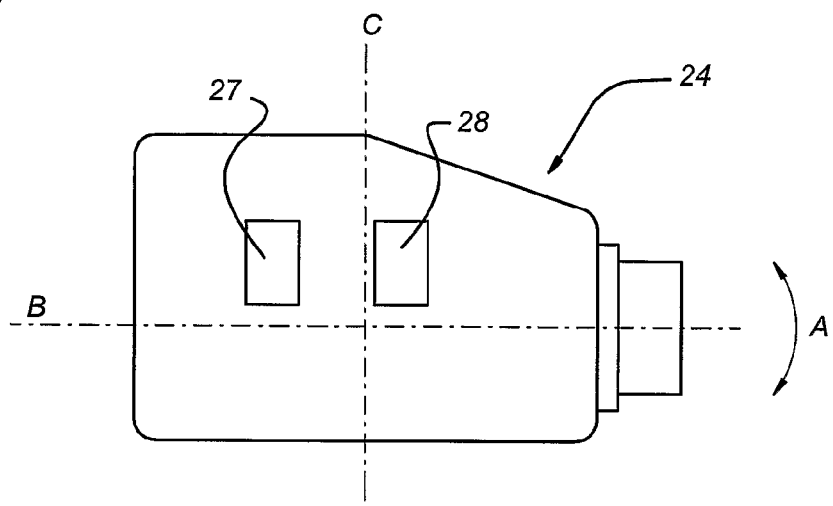
Figure 8A:
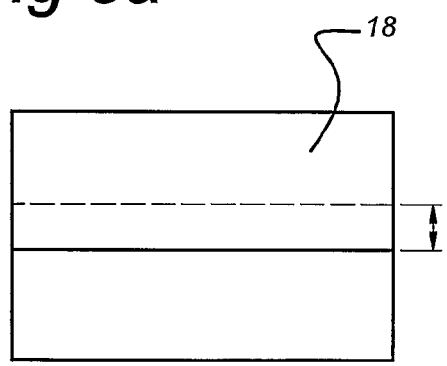
Figure 8B:
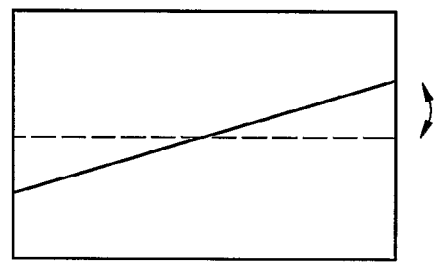
Figure 9:
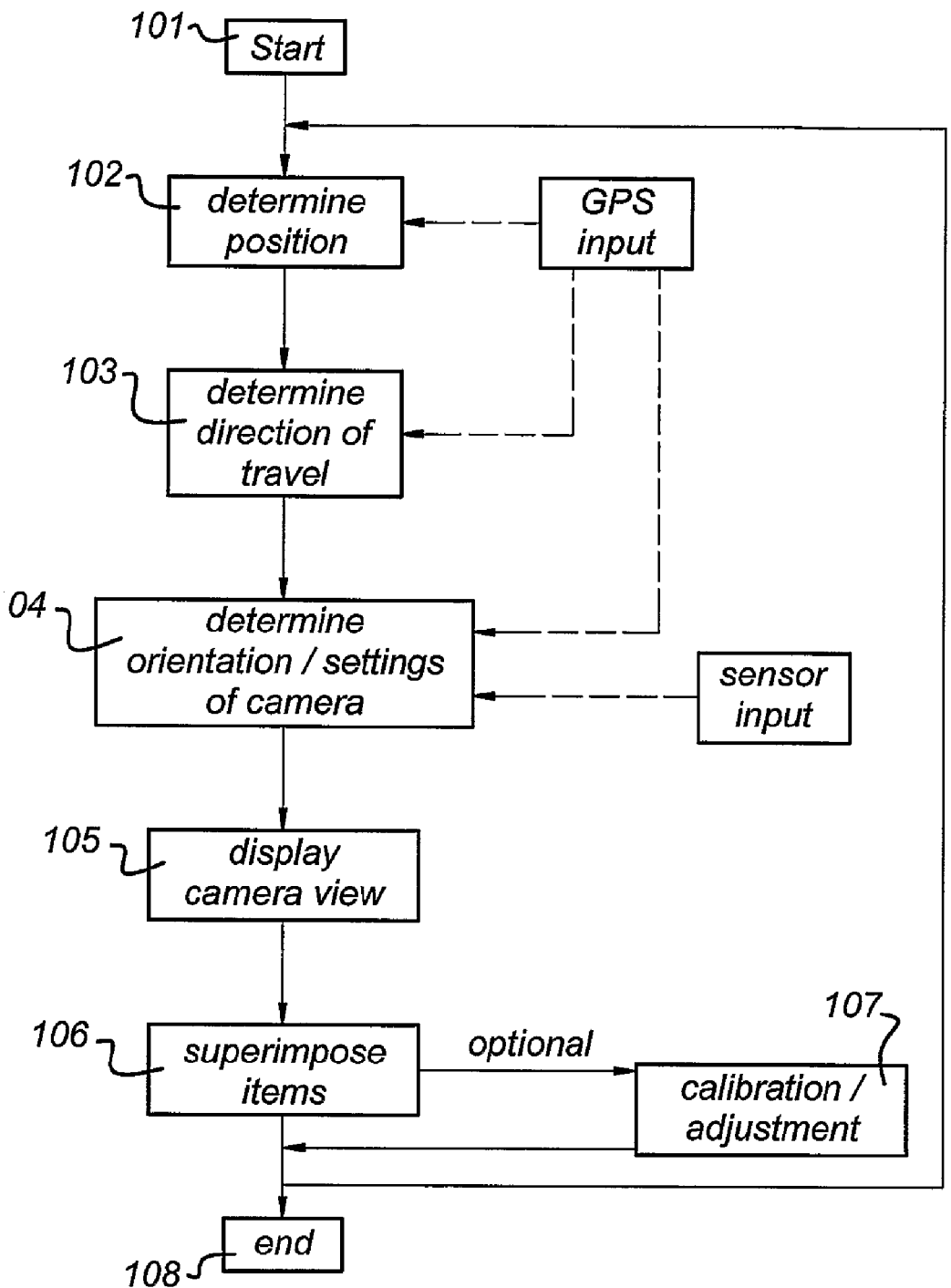
Figure 10:
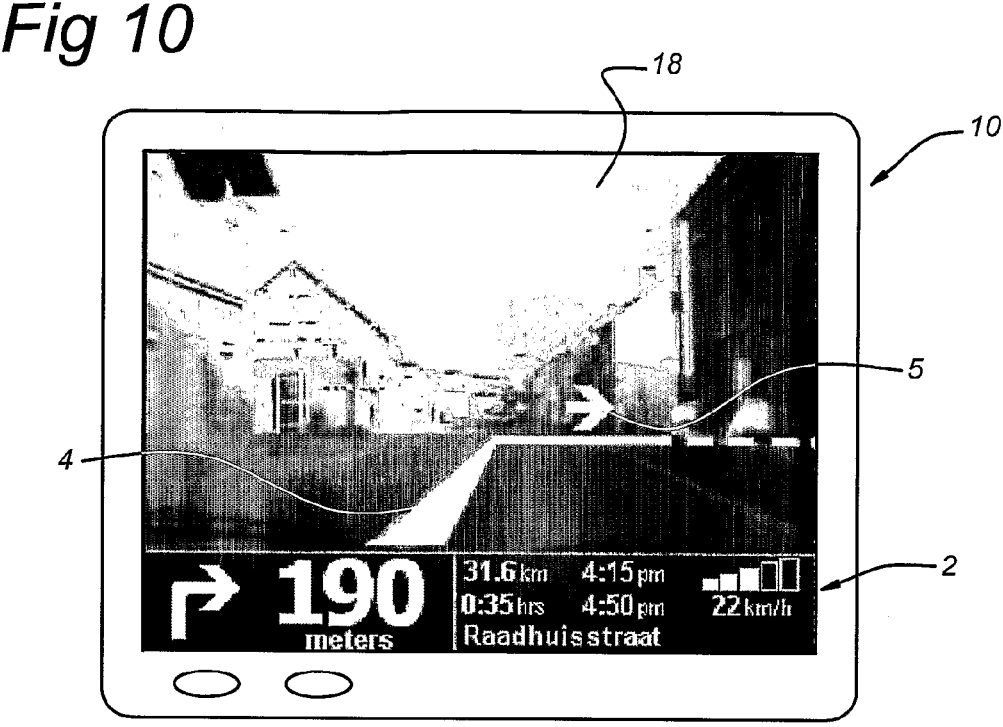
Figure 11:
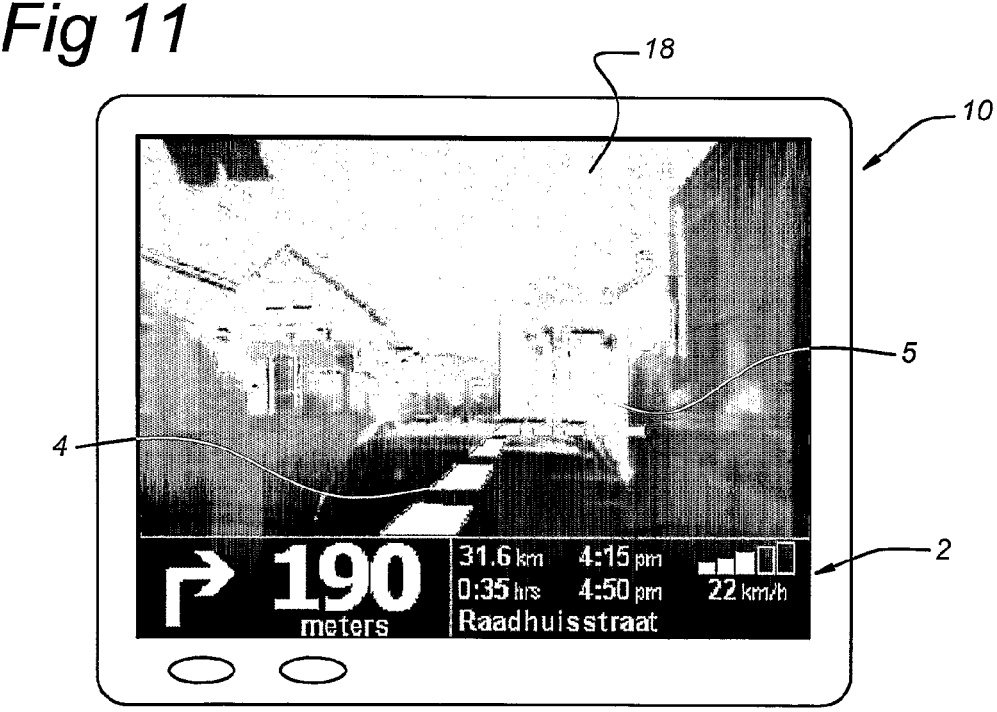
Figure 12:
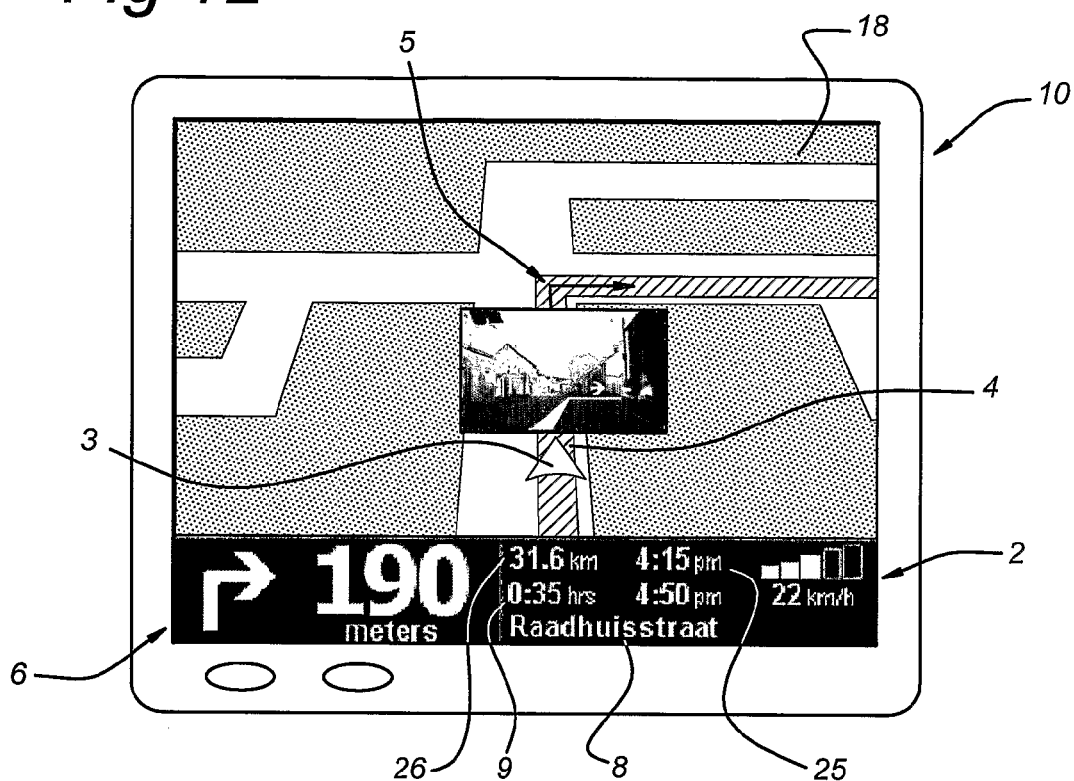

Embodiments of the invention will now be described, by way of example only, with reference to the accompanying schematic drawings in which corresponding reference symbols indicate corresponding parts, and in which:

FIG. 1 schematically depicts a schematic block diagram of a navigation device,

FIG. 2 schematically depicts a schematic view of a navigation device,

FIG. 3 schematically depicts a schematic block diagram of a navigation device according an embodiment of the invention, FIG. 4 schematically depicts a vehicle comprising a navigation device according to an embodiment of the invention, FIG. 5 schematically depicts a navigation device according to an embodiment of the invention, FIG. 6 schematically depicts a navigation device according to an embodiment of the invention, FIG. 7 schematically depicts a camera according to an embodiment of the invention, FIGS. 8a and 8b schematically depict different movement of the camera image on the display as a result of different tilts of the camera, FIG. 9 schematically depicts a flow diagram of the functionality of the navigation device 10 according to an embodiment of the invention, FIG. 10 schematically depicts a navigation device according to an embodiment of the invention, FIG. 11 depicts a navigation device according to an embodiment of the invention, and FIG. 12 depicts a navigation device according to a further embodiment of the invention.

DETAILED DESCRIPTION OF THE INVENTION

FIG. 1 shows a schematic block diagram of an embodiment of a navigation device 10, comprising a processor unit 11 for performing arithmetical operations. The processor unit 11 is arranged to communicate with memory units that store instructions and data, such as a hard disk 12, a Read Only Memory (ROM) 13, Electrically Erasable Programmable Read Only Memory (EEPROM) 14 and a Random Access Memory (RAM) 15. The memory units may comprise map data 22. This map data may be two dimensional map data (latitude and longitude), but may also comprise a third dimensions (height). The map data may further comprise additional information such as information about petrol/gas stations, points of interest. The map data may also comprise information about the shape of buildings and objects along the road.

The processor unit 11 may also be arranged to communicate with one or more input devices, such as a keyboard 16 and a mouse 17. The keyboard 16 may for instance be a virtual keyboard, provided on a display 18, being a touch screen. The processor unit 11 may further be arranged to communicate with one or more output devices, such as a display 18, a speaker 29 and one or more reading units 19 to read for instance floppy disks 20 or CD ROM's 21. The display 18 could be a conventional computer display (e.g. LCD) or could be a projection type display, such as the head up type display used to project instrumentation data onto a car windscreen or windshield. The display 18 may also be a display arranged to function as a touch screen, which allows the user to input instructions and/or information by touching the display 18 with his finger.

The processor unit 11 may further be arranged to communicate with other computing devices or communication devices using an input/output device 25. The input/output device 25 is shown to be arranged to equip communication via a network 27.

The speaker 29 may be formed as part of the navigation device 10. In case the navigation device 10 is used as an in-car navigation device, the navigation device 10 may use speakers of the car radio, the board computer and the like.

The processor unit 11 may further be arranged to communicate with a positioning device 23, such as a GPS receiver, that provides information about the position of the navigation device 10. According to this embodiment, the positioning device 23 is a GPS based positioning device 23. However, it will be understood that the navigation device 10 may implement any kind of positioning sensing technology and is not limited to GPS. It can hence be implemented using other kinds of GNSS (global navigation satellite system) such as the European Galileo system. Equally, it is not limited to satellite based location/velocity systems but can equally be deployed using ground-based beacons or any other kind of system that enables the device to determine its geographical location.

However, it should be understood that there may be provided more and/or other memory units, input devices and read devices known to persons skilled in the art. Moreover, one or more of them may be physically located remote from the processor unit 11, if required. The processor unit 11 is shown as one box, however, it may comprise several processing units functioning in parallel or controlled by one main processor that may be located remote from one another, as is known to persons skilled in the art.

The navigation device 10 is shown as a computer system, but can be any signal processing system with analog and/or digital and/or software technology arranged to perform the functions discussed here. It will be understood that although the navigation device 10 is shown in FIG. 1 as a plurality of components, the navigation device 10 may be formed as a single device.

The navigation device 10 may use navigation software, such as navigation software from TomTom B.V. called Navigator. Navigator software may run on a touch screen (i.e. stylus controlled) Pocket PC powered PDA device, such as the Compaq iPaq, as well as devices that have an integral GPS receiver 23. The combined PDA and GPS receiver system is designed to be used as an in-vehicle navigation system. The invention may also be implemented in any other arrangement of navigation device 10, such as one with an integral GPS receiver/computer/display, or a device designed for non-vehicle use (e.g. for walkers) or vehicles other than cars (e.g. aircraft).

FIG. 2 depicts a navigation device 10 as described above.

Navigator software, when running on the navigation device 10, causes a navigation device 10 to display a normal navigation mode screen at the display 18, as shown in FIG. 2. This view may provide driving instructions using a combination of text, symbols, voice guidance and a moving map. Key user interface elements are the following: a 3-D map occupies most of the screen. It is noted that the map may also be shown as a 2-D map.

The map shows the position of the navigation device 10 and its immediate surroundings, rotated in such a way that the direction in which the navigation device 10 is moving is always "up". Running across the bottom quarter of the screen may be a status bar 2. The current location of the navigation device 10 (as the navigation device 10 itself determines using conventional GPS location finding) and its orientation (as inferred from its direction of travel) is depicted by a position arrow 3. A route 4 calculated by the device (using route calculation algorithms stored in memory devices 11, 12, 13, 14, 15 as applied to map data stored in a map database in memory devices 11, 12, 13, 14, 15) is shown as darkened path. On the route 4, all major actions (e.g. turning corners, crossroads, roundabouts etc.) are schematically depicted by arrows 5 overlaying the route 4. The status bar 2 also includes at its left hand side a schematic icon depicting the next action 6 (here, a right turn). The status bar 2 also shows the distance to the next action (i.e. the right turn—here the distance is 50 meters) as extracted from a database of the entire route calculated by the device (i.e. a list of all roads and related actions defining the route to be taken). Status bar 2 also shows the name of the current road 8, the estimated time before arrival 9 (here 2 minutes and 40 seconds), the actual estimated arrival time 25 (11.36 am) and the distance to the destination 26 (1.4 Km). The status bar 2 may further show additional information, such as GPS signal strength in a mobile-phone style signal strength indicator.

As already mentioned above, the navigation device may comprise input devices, such as a touch screen, that allows the users to call up a navigation menu (not shown). From this menu, other navigation functions can be initiated or controlled. Allowing navigation functions to be selected from a menu screen that is itself very readily called up (e.g. one step away from the map display to the menu screen) greatly simplifies the user interaction and makes it faster and easier. The navigation menu includes the option for the user to input a destination.

The actual physical structure of the navigation device 10 itself may be fundamentally no different from any conventional handheld computer, other than the integral GPS receiver 23 or a GPS data feed from an external GPS receiver. Hence, memory devices 12, 13, 14, 15 store the route calculation algorithms, map database and user interface software; a processor unit 12 interprets and processes user input (e.g. using a touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination into the navigation software running on the navigation device 10, using the input devices provided, such as a touch screen 18, keyboard 16 etc. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of navigation software (or is otherwise accessed by it) running on the navigation device 10 as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the navigation software. The algorithms are applied to score large numbers of potential different routes. The navigation software then evaluates them against the user defined criteria (or device defaults), such as a full mode scan, with scenic route, past museums, and no speed camera. The route which best meets the defined criteria is then calculated by the processor unit 11 and then stored in a database in the memory devices 12, 13, 14, 15 as a sequence of vectors, road names and actions to be done at vector end-points (e.g. corresponding to pre-determined distances along each road of the route, such as after 100 meters, turn left into street x).

FIG. 3 depicts a schematic block diagram of a navigation device 10 according to the invention, in which corresponding reference symbols refer to corresponding parts as in FIGS. 1 and 2.

According to the invention a camera 24 is provided that is arranged to provide a real time feed to the processor unit 11. The camera 24 is, in use, positioned such that it registers the road ahead of the user. When positioned in a car, the camera 24 is positioned such that it registers the road ahead of the vehicle. The camera 24 may be integral with the navigation device 10, or may be physically separate from it. If separate, the camera 24 may be connected to the processor unit 11 via cabling or via a wireless connection. The camera 24 may be positioned on the roof of the vehicle or at the front of the vehicle, for instance close to the headlights.

The navigation device 10 may also be provided with more than one camera 24, to allow the user to switch between different camera angles. Also a rear view camera may be provided. The camera may be any type of camera, such as a digital camera or an analogue camera. The image as registered by the camera 24 is displayed at the display 18.

The camera 24 may also be a camera that is sensitive to electro-magnetic radiation outside the electro-magnetic spectrum that is visible by the human eye. The camera may be an infrared camera that enables use at night.

FIG. 4 shows an example of a navigation device 10, positioned on the dashboard of a car 1. The navigation device 10 comprises a camera 24 that is directed at the road ahead of the car 1. FIG. 4 further shows that the display 18 faces the user.

According to the invention, the navigation device 10 is arranged to display the real time feed from the camera on the display 18 and to combine or superimpose one or more navigation directions. The navigation directions may be one or more of the following: position arrow 3, the route 4, arrow 5, points of interest, roads, buildings and all further navigation directions stored in the navigation device 10. This may also include the map data itself, e.g. the vector data describing the roads. A more detailed description of how this is achieved follows below.

The images provided by the camera 24 will not be steady, due to the bumpiness of the road, vibrations of the vehicle caused by the engine etc. Therefore, the navigation device 10 may be provided with software that cancels these unwanted vibrations to provide a steady image. Software that cancels unwanted vibrations of the images provided by the camera 24 is widely used in video cameras, where it is used under the name steady cam. This is known to a skilled person.

The feed from the camera 24 may further be processed to increase the quality of the images. This processing may comprise adjusting the brightness, contrast, but may be any suitable filter. Filters may be used to increase the quality of the images in rainy conditions.

The feed from the camera 24 can be displayed on the display in real-time, but may also be displayed as a still that is updated at certain points in time, for instance every 0.5 seconds. The appropriate time intervals between successive updates may be determined in dependence of the speed of the navigation device 10 vehicle, change of direction of travel (taking bends).

Also, the navigation device may be arranged to perform zoom in or out depending on, for instance, the speed of the navigation device/vehicle. This zoom operation may be performed by sending a control signal to the camera 24 giving it instructions to perform a zoom operation. The zoom operation may however also be performed by displaying a part of the received camera feed in an enlarged way at the display 18.

Embodiment 1

FIG. 5 depicts a first example of the invention. FIG. 5 shows a still of the image registered by the camera 24 as displayed by the navigation device 10. As can be seen, an arrow 5 indicating a right turn is superimposed by the processor unit 11. According to this embodiment, a user-friendly image is displayed to the user, allowing easy interpretation. This embodiment has the advantage that no complex mathematics and data processing is needed.

Instead of the navigation direction depicted in FIG. 5, also other navigation directions as mentioned above may be displayed, including perspective shaped navigation directions, such as perspective shaped arrows.

Embodiment 2

FIG. 6 shows another still of the image registered by the camera 24. According to this example, the navigation device 10 superimposes the route 4 and the arrow 5. The route 4 and the arrow 5 are superimposed in such a way that their position on the display 18 corresponds with the image as provided by the camera 24. FIG. 6 clearly shows that the route 4 is displayed such that it corresponds with the road as shown on the display 18. Also, the arrow 5 is displayed in such a way that it accurately indicates a right turn in the image as provided by the camera 24.

It will be understood that the embodiment shown in FIG. 5 can easily be obtained by superimposing or combining the image as provided by the camera 24 and a navigation direction, as for instance the arrow 5. However, in order to create the image as provided in FIG. 6, more complicated data processing is required in order to match the image as provided by the camera 24 with the navigation directions. This will be explained in more detail below.

In order to superimpose the navigation directions such that it has a predefined spatial relationship with respect to corresponding parts of the camera image, the exact camera position, direction and camera settings need to be known. If all this information is known, the processing unit 11 computes the position of for instance the road on the display 18 and superimposes the route 4.

First, the position of the camera 24 needs to be determined. This may simply be done by using the GPS information as determined by the processing unit 11 and/or the positioning device 23. The position information of the navigation device 10, and thus the camera 24, is already available in the navigation device 10 according to prior art use.

Second, the orientation of the camera 24 needs to be determined. This is done using orientation sensors, arranged to communicate with the processing unit 11. The orientation sensors may be the positioning device 23 and tilt sensors 27, 28. The tilt sensors 27, 28 may be gyroscopes.

FIG. 7 depicts a camera 24 according to an embodiment of the invention. A first rotational direction needs to be determined with respect to an axis C, as depicted in FIG. 7. Also, this may simply be done using the GPS information as determined by the processing unit 11 and/or the positioning device 23. By comparing the position of the navigation device 10 at successive points in time, the direction of movement of the navigation device 10 can be determined. This information is also already available in the navigation device 10 according to prior art use. It is assumed that the camera 24 faces in the direction of travel of the navigation device 10. However, this is not necessarily the case, as will be further explained below.

The first rotational direction C of the camera 24 may also be determined by using a (electronic) compass comprised by the navigation device or camera 24. The compass may be an electronic compass or an analogue compass. The compass provides compass readings that are communicated to the processing unit 11. Based on the compass readings the processing unit 11 determines the first rotational direction of the camera 24.

In order to further determine the orientation of the camera 24, the camera 24 may be provided with tilt sensors 27, 28 as depicted by FIG. 7. The tilt sensors 27, 28 are arranged to measure the tilt of the camera 24. The first tilt sensor 27 is arranged to measure the tilt in a second rotational direction as indicated by the curved arrow A in FIG. 7, i.e. a rotation about an axis being substantially perpendicular to the drawings surface. The tilt in the second rotational direction determines the height of the horizon in the camera image as displayed on the display 18. The effect of such a rotation on the camera image as displayed is schematically depicted in FIG. 8a.

The second tilt sensor 28 is arranged to measure the tilt as a result of a rotation about a third rotational axis, being a central axis, of the camera 24 depicted in FIG. 7 by the dotted line B. The effect of such a rotation on the camera image as displayed is schematically depicted in FIG. 8b.

In use, the first rotational axis is substantially vertical and the second and third rotational axes are substantially perpendicular with respect to the first rotational axis and with respect to each other.

The tilt values as determined by the tilt sensors 27, 28 are communicated to the processor unit 11. Tilt sensors 27 and 28 may also be formed as a single integral tilt sensor.

Also, the camera settings, in particular the zoom factor of the lens of the camera 24, camera angle, focal length etc., may be communicated to the processor unit 11.

Based on the information available to the processor unit 11 for describing the position, direction and settings of the camera 24, the processor unit 11 determines the position where the road, crossings, forks, points of interest etc. corresponding to the map data stored in the memory devices 11, 12, 13, 14, 15 are to be displayed at the display 18.

Based on this information, the processor unit 11 may superimpose navigation directions, such as the route 4, the arrow 5, points of interest POI etc. over the camera image as displayed by the processor unit 11, such that they coincide with the camera view. It may be useful to superimpose the navigation directions so that they appear to float above the road surface or have some other pre-defined spatial relationship to it.

Since the navigation device 10 computes how far away any junction or turning (or other directional change) is, it can work out approximately how a navigation direction displayed on the display 18 should be shaped and where it should be positioned in order to correspond to the actual location of the change in direction as shown on the feed from the camera 24.

However, errors may occur because of several reasons. In the first place, the navigation device 10 can be mounted on the dashboard of a vehicle in many ways. For instance, when determining the first rotational direction of the camera 24 with respect to the axis C by comparing positions of the navigation device 24 at successive points in time, it is assumed, that the camera 24 is directed straight ahead. However, in case the camera 24 is not perfectly aligned with the vehicle, a mismatch of the superimposed navigation directions may occur.

As discussed above, in case the camera 24 is provided with a built-in compass, the first rotational orientation of the camera with respect to axis C can be computed by comparing the compass readings with the determined direction of travel of the navigation device 10. However, still an error may be present resulting in a mismatch between the superimposed navigation directions and the camera feed.

Also, the tilt sensors 27, 28 may be only capable of measuring relative tilt, and not absolute tilt. This means that the navigation device 10 needs to be calibrated in order to allow accurate positioning of the navigation directions over the camera image.

In order to compensate for these errors, the navigation device 10 may be provided with a menu option that allows the user to adjust the relative position of the displayed image with respect to the displayed camera image. This adjustment may be carried out by the navigation device 10 by changing the position where the navigation directions are displayed, and/or by changing the position where the camera image is displayed, and/or by changing the orientation of the camera 24. For the last option, the camera 24 may be provided with an actuation device to change its orientation. The camera 24 may be actuated independent of the navigation device 10. In case the camera 24 is integrally formed with the navigation device 10, the actuation device may change the orientation of the navigation device 10, or of the camera 24 only with respect to the navigation device 10.

The user may simply use arrow keys to calibrate the position of the navigation directions to make them matching with the camera image. For instance, if the camera 24 is positioned in such a way, that it is tilted to the left about the axis C as depicted in FIG. 7, the navigation directions are right from the corresponding parts in the camera image. The user can simply correct for this error by using a left key arrow to drag the navigation directions to the left. The navigation device 10 may further be arranged to provide the user with options to adjust the displayed rotational orientation of the superimposed navigation directions with respect to the displayed camera image.

The navigation device 10 may also be arranged to provide the user with options to correct for perspective mismatching, for instance caused by different heights of the camera 24. A camera 24 positioned on top of a car provides a different view of the road (different perspective shape) than a camera 24 positioned on the dashboard or between the headlights of a vehicle. In order to make the navigation directions, such as 3D directions (e.g. a 3D arrow) or the vector representation of the road, to fit the camera view, a perspective deformation of the navigation directions need to be applied. This perspective deformation depends from the height of the camera 24, the camera settings and the second rotational direction of the camera 24 in the direction of arrow A as depicted in FIG. 7.

The processor unit 11 stores these inputted calibration corrections and applies similar calibration corrections to all further displayed images. All further changes in the measured position, direction and orientation of the camera 24 can be processed by the processor unit 11 to continuously ensure accurate superimposing of the navigation directions. This allows accurate compensation of camera movements caused change of direction of the vehicle, or caused by speed ramps, sharp corners, accelerations, braking etc. and other causes influencing the orientation of the camera 24.

FIG. 9 depicts a flow diagram depicting the functionality of the navigation device 10 according to the second embodiment of the invention. The steps shown in the flow diagram may be performed by the processing unit 11. It is noted that all steps relating to the inputting of a destination address, selecting a route etc. are omitted in this figure as these steps are already known in the prior art.

In a first step 101, the navigation device 10 is switched on and the user selects the camera modus. This is depicted in FIG. 9 with "start".

In a second step 102, the processing unit 11 determines the position of the navigation device 10. This is done by using input from the positioning device 23, such as a GPS device, as discussed above.

In a next step 103, the processing unit 11 determines the direction of travel of the navigation device 10. Again, input from the positioning device 23 is used for this.

Next, in step 104, the orientation of the camera 24 and the camera settings are determined by the processing unit 11. Again, input is used from the positioning device 23. Input is also used from the tilt sensors 27, 28 to determine the orientation of the camera 24.

According to step 105, the camera image is displayed on the display 18 by the processing unit 11. In step 106, the processing unit 11 superimposes a selected number of navigation directions (such as position arrow 3, route 4, arrow 5, points of interest, roads, map data etc.). In order to do this, all collected information is used to compute the position and shape of the displayed navigation directions. If needed, the user may calibrate this computation by adjusting the position and/or shape of the superimposed navigation directions. This optional step is depicted by step 107.

Steps 102-107 may be repeated as often as needed or desired during use.

Other kinds of virtual signage in addition to direction arrows 5 may also be stored in memory devices 12, 13, 14, 15.

For example, icons relating to road names, traffic signs, speed limits, speed cameras, or points of interest stored in memory devices 12, 13, 14, 15 may be stored. All of these can also be superimposed over the feed from the camera 24, with a spatial location in the displayed camera image that corresponds to the real world feature that the virtual signage relates to. Hence, the processing unit 11 could take the 2D map data from the navigation software that included the location data for these real world features, and apply a geometrical transformation that causes them to be correctly located when superimposed in the video feed.

In case e.g. a vehicle carrying a navigation device 10 drives up or down a hill, the tilt sensors 27, 28 detect a tilt in the direction of arrow A as depicted in FIG. 7. However, in order to correctly superimpose the navigation directions over the camera image such that the navigation directions coincide with the camera image, this tilt should not be corrected for. This can be arranged by providing the navigation device with map data comprising height information. Based on the map height data, the navigation device 10 computes the tilt of the camera 24 that corresponds with the orientation of the road the vehicle is traveling on. This predicted tilt is compared with the tilt as detected by the tilt sensors 27, 28. The difference between the predicted tilt and the detected tilt is used to adjust the position of the superimposed navigation directions.

In case the map data doesn't comprise height information, the vehicle may be provided with a vehicle tilt sensor 30. The vehicle tilt sensor 30 is arranged to provide vehicle tilt readings to the processing unit 11. The readings of the vehicle tilt sensor 30 are then compared with the readings of the tilt sensors 27, 28 and the difference, caused by unwanted vibrations etc., is used to adjust the position of the superimposed navigation directions.

It will be understood that all kinds of variations to the above explained and shown example can be thought of.

FIG. 10 depicts an example in which the map data also comprises data describing objects along the road, such as buildings 31. According to this example, the navigation directions 3, 4, 5 that are superimposed over a building 31 can be shown by dashed or blinking lines. This allows a user to visualize map data, route 4 and arrows 5 that would otherwise be blocked from sight by a building.

Third Embodiment

According to a third embodiment, the navigation directions are superimposed over the camera image by using pattern recognition techniques.

In recent years, considerable progress has been made in the field of real time analysis of image frames (e.g. a video feed such as provided by camera 24) to identify actual objects in the video feed. The literature is quite extensive in this area: reference may for example be made to U.S. Pat. No. 5,627,915 (Princeton Video Image Inc.) in which video from a scene such as a sports stadium is analysed by pattern recognition software; an operator manually indicates high contrast areas in the stadium (e.g. lines marked on the playing surface; edges of the playing surface; billboards) and the software builds up a geometrical model of the entire stadium using these high contrast landmarks. Then, the software is able to analyse a real time video feed looking for these landmarks; it is then able to take a stored computer generated image (e.g. an advertisement for a billboard), apply a geometrical transform to the stored image so that, when inserted into the video feed at a location defined with reference to the geometrical model using image synthesis techniques, it appears to be an entirely natural part of the scene to a viewer of the video.

Reference may also be made to US 2001/0043717 to Facet Technology; this discloses a system that can analyse video taken from a moving vehicle to recognise road signs.

Overall, the pattern recognition arts applied to the analysis of real time video in order to recognise real world features is a large and well established field.

In one implementation, the navigation device 10 deploys pattern recognition software to recognise real world features in the video feed from the camera 24 and displays the navigation directions (such as arrow 5) on the display 18 in a pre-defined spatial relationship to the real world features recognised in the video feed. For example, the video feed might show the current road that the navigation device 10 is travelling along and the navigation directions are then 3D directions (e.g. a 3D arrow) that are superimposed over that road. Road turnings and other features can be graphically or iconically represented and be positioned to overlie the real world features that they relate to.

The processing unit 11 may be programmed so that it can recognise features with a high visual contrast and that are associated with a given road. The features could also be vehicles moving in a consistent direction or road markings (e.g. edge markings, centre line markings etc.).

It is noted that the navigation device 10 is programmed so that it can recognise features with a high visual contrast and that are associated with a road. For example, the features could be vehicles moving in a consistent direction, or road markings.

The navigation device 10 could for example be programmed with a geometrical model of the road ahead: the model can be as simple as two lines. The model may just be the vector data stored to form the map data, as described above.

Then, in use, the pattern recognition software looks for visual features in the real time video stream provided by the camera 24 that correspond to the stored geometrical model (e.g. the two lines). Once it has located these features, it has in effect recognised the road ahead. This will typically require rapid translations and transformation to be applied to the features recognised in the video feed (e.g. the two lines) to get a match to the stored model; the translations are x-y translations in order to approximately align the recognised features with the stored model. The transformations include foreshortening to correspond to different camera heights and relative orientation between the two lines to correspond to different camera viewing angles and the relative angle between camera and road. Equally, the transformations can be applied to align and shape the stored model to the recognised features.

It will be understood by a skilled person it is advantageous for the pattern recognition algorithm to have the map data as an input. Recognizing a pattern can be done in an easier and faster way when the algorithm has knowledge beforehand about the patterns to recognize. This knowledge can easily be obtained from the available map data.

Once the transformation is known, it is a relatively simple matter of shaping a pre-stored arrow icon so that it's perspective, shape or orientation corresponds to that of the road in any given video frame (various kinds of geometrical transforms may be suitable for this) and then superimposing the directional arrow over the road shown in the display using conventional image synthesis. It may be useful to superimpose the arrow so that it appears to float above the road surface or have some other pre-defined spatial relationship to it.

Since the navigation device 10 computes how far away any junction or turning (or other directional change) is, it can work out approximately how a navigation direction displayed on the display 18 should be shaped in order to correspond to the actual location of the change in direction as shown on the video feed.

It will be understood that the navigation device 10 may also use a combination of the embodiments discussed above. For instance, the navigation device may use orientation and positioning measurements to roughly determine the position of the navigation directions on the display 18 and use pattern recognition techniques to determine the position of the navigation directions on the display 18.

It will be understood that many alternatives and variations to the above mentioned embodiments can be thought of. For instance, another feature is that indication of road names, traffic signs (e.g. one way, no entry, exit numbers, place names etc.), speed limits, speed cameras, and points of interest stored in device memory 12, 13, 14, 15 can also be superimposed over the video feed—the spatial location of this 'virtual signage' in a video frame can correspond to the real world feature that the virtual signage relates to. Hence, a speed limit (e.g. the text '30 mph') could be superimposed so that it appears to overlie or be part of the road surface of the road with the 30 mph speed limit. An icon representing a specific kind of traffic sign could be superimposed over the video stream so that it appears in the place that a real world sign would usefully appear.

Other kinds of virtual signage in addition to direction arrows 5 may also be stored in memory devices 12, 13, 14, 15. For example, icons relating to road names, traffic signs, speed limits, speed cameras, bus stops, museums, house numbers or points of interest may be stored in memory devices 12, 13, 14, 15. All of these can also be superimposed over the video feed, with a spatial location in the displayed video that corresponds to the real world feature that the virtual signage relates to. Hence, the software could take the 2D map data from the navigation software that included the location data for these real world features, and apply a geometrical transformation that causes them to be correctly located when superimposed in the video feed.

According to a further alternative, the pattern recognition techniques may also be arranged to recognise objects on the road, such as for instance an other vehicle or truck. When such an object is recognized, the displayed route 4 may be shown as a dotted line, such as shown in FIG. 11. This provides an image that more easy to interpret by a user.

Fourth Embodiment

According to fourth embodiment the feed from the camera 24 and the navigations directions, such as position arrow 3, route 4, arrow 5, points of interest (POI), roads, buildings, map data, e.g. vector data are not superimposed, but shown on the display 18 in a combined way.

This combination may be achieved by dividing the display in a first part and a second part, where the first part displays the camera feed and the second part displays the navigations directions. However, the combination may also be performed in time, i.e. the navigation device may be arranged to successively show the camera feed and the navigation direction in turns. This may be accomplished by showing the camera feed for a first period (e.g. 2 seconds) and next, showing the navigation directions for a second period (e.g. 2 seconds). However, the navigation device may also provide the user with the option to switch between the camera feed and the navigation directions at his desire.

Of course, more than one camera may be used. The user may be provided with the option to switch from a first camera feed to a second camera feed. The user may also choose to display more than one camera feed on the display 18 at the same time.

According to a further alternative, the user may zoom in or out. When zooming out, more and more of the environment of the navigation device 10 will become displayed on the display 18. It will be understood that the user may choose for instance a helicopter view, as shown in FIG. 2, including the position of the navigation device 10. Such a view provides an image of the navigation device 10 (or vehicle) seen from behind. Of course, such a view can not be provided by the camera, being fixed on the navigation device 10 or vehicle. Therefore, the navigation device 10 may provide an image as shown in FIG. 12, where only part of the image is the camera view, surrounded by map data and navigation directions.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein. It will be understood by a skilled person that any of the software components may also be formed as a hardware component.

The descriptions above are intended to be illustrative, not limiting. Thus, it will be apparent to one skilled in the art that modifications may be made to the invention as described without departing from the scope of the claims set out below.

The invention claimed is:

1. A device, comprising:
 a processing unit; and
 a memory arranged to store information having associated location data,
 the processing unit being arranged to receive a video feed from a camera and data from a positioning device indicative of the location of at least one of the device and camera,
 the processing unit being further arranged to display a combination of a camera image from the video feed from the camera and virtual signage on a display, the virtual signage comprising the stored information or an icon representative thereof, and the virtual signage being superimposed over the camera image with a spatial location in the displayed camera image that corresponds to the location data of the stored information,
 wherein the device is arranged to receive user-input calibration corrections to adjust the location of the virtual signage with respect to the displayed camera image via a device menu.

2. The device of claim 1, wherein the device is a navigation device positionable in a vehicle.

3. The device of claim 1, wherein the device is a handheld device and the camera is formed integrally with the device.

4. The device of claim 3, wherein the processing unit is further arranged to receive readings from at least one orientation sensor formed integrally with the device, and to use the readings to compute an orientation of the device.

5. The device of claim 4, wherein the computed orientation is used by the processing unit to superimpose the virtual signage over the camera image.

6. The device of claim 1, wherein the virtual signage relates to one or more of: roads; road names; traffic signs; speed limits; speed cameras; buildings and points of interest.

7. The device of claim 1, wherein the processing unit is further arranged to receive readings from at least one orientation sensor, and to use the readings to compute an orientation of at least one of the device and camera.

8. The device of claim 7, wherein the computed orientation is used by the processing unit to superimpose the virtual signage over the camera image.

9. The device of claim 1, wherein the device is arranged to receive calibration corrections, to store these calibration corrections, and to apply the calibration corrections when superimposing the virtual signage over the camera image.

10. A non-transitory computer readable medium comprising instructions which, when executed on a processing unit of a device, cause the processing unit to:

receive a video feed from a camera and data from a positioning device indicative of the location of at least one of the device and camera;

access information stored on a memory of the device, said information having associated location data;

display a combination of a camera image from the video feed from the camera and virtual signage on a display, the virtual signage comprising the stored information or an icon representative thereof, and the virtual signage being superimposed over the camera image with a spatial location in the displayed camera image that corresponds to the location data of the stored information; and receive user-input calibration corrections to adjust the location of the virtual signage with respect to the displayed camera image via a device menu.

* * * * *

UNITED STATES PATENT AND TRADEMARK OFFICE
CERTIFICATE OF CORRECTION

PATENT NO. : 8,352,180 B2  Page 1 of 1
APPLICATION NO. : 13/432183
DATED : January 8, 2013
INVENTOR(S) : Pieter Geelen and Marc Mattu It is certified that error appears in the above-identified patent and that said Letters Patent is hereby corrected as shown below:

On the Title Page Item (63) should read,

Related U.S. Application Data

Continuation of application No. 11/920,730, filed as application No. PCT/NL2005/000405 on Jun. 6, 2005, now Pat. No. 8,180,567.

Signed and Sealed this
Sixteenth Day of December, 2014

Michelle K. Lee
*Deputy Director of the United States Patent and Trademark Office*